(12) United States Patent
Inamoto et al.

(10) Patent No.: US 10,474,283 B2
(45) Date of Patent: Nov. 12, 2019

(54) TRANSPARENT PLATE, TOUCH PAD, AND TOUCH PANEL

(71) Applicant: AGC Inc., Chiyoda-ku (JP)

(72) Inventors: Misa Inamoto, Chiyoda-ku (JP); Takashi Shibuya, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 110 days.

(21) Appl. No.: 15/584,596

(22) Filed: May 2, 2017

(65) Prior Publication Data

US 2017/0235418 A1   Aug. 17, 2017

Related U.S. Application Data

(63) Continuation of application No. PCT/JP2015/082371, filed on Nov. 18, 2015.

(30) Foreign Application Priority Data

Nov. 20, 2014 (JP) ................................ 2014-236007
Jul. 14, 2015 (JP) ................................ 2015-140171

(51) Int. Cl.
*G06F 3/041* (2006.01)
*C03C 17/32* (2006.01)
(Continued)

(52) U.S. Cl.
CPC ............ *G06F 3/0416* (2013.01); *C03C 17/32* (2013.01); *C03C 17/42* (2013.01); *G06F 3/041* (2013.01);
(Continued)

(58) Field of Classification Search
None
See application file for complete search history.

(56) References Cited

U.S. PATENT DOCUMENTS 8,124,215 B2 * 2/2012 Takao .................... G02B 1/105
359/601
2009/0197048 A1   8/2009 Amin et al.
(Continued)

FOREIGN PATENT DOCUMENTS

CN   101046520 A   10/2007
CN   101939266 A    1/2011
(Continued)

OTHER PUBLICATIONS

International Search Report dated Jan. 26, 2016 in PCT/JP2015/082371, filed on Nov. 18, 2015 ( with English Translation).
(Continued)

*Primary Examiner* — Darryl J Collins
*Assistant Examiner* — Journey F Sumlar
(74) *Attorney, Agent, or Firm* — Oblon, McClelland, Maier & Neustadt, L.L.P.

(57) ABSTRACT

A transparent plate includes a transparent substrate and an antifouling layer. A surface of the transparent substrate includes a fine projecting and recessed structure with a surface roughness of 2.0-100 nm. The antifouling layer includes fluorine, and at least a part of the antifouling layer is formed on a position of the fine projecting and recessed structure. A haze value of the transparent plate at the position of the fine projecting and recessed structure is 2% or less. A value of X defined by $(S_1-S_2)/(S_3-S_2)$ is 0.5 or more, where $S_1$, $S_2$ and $S_3$ are F-K$\alpha$ line strengths of the transparent plate at the position of the fine projecting and recessed structure, a reference glass plate that does not include fluorine, and a reference aluminosilicate glass plate that includes fluorine of 2 wt %, respectively, and $S_1$, $S_2$ and $S_3$ are measured by a fluorescent X-ray measurement device.

10 Claims, 4 Drawing Sheets

(51) Int. Cl.
*C03C 17/42* (2006.01)
*C03C 15/00* (2006.01)

(52) U.S. Cl.
CPC .......... *C03C 15/00* (2013.01); *C03C 2217/73* (2013.01); *C03C 2217/75* (2013.01); *C08J 2300/10* (2013.01); *G06F 2203/04103* (2013.01)

(56) References Cited

U.S. PATENT DOCUMENTS

2011/0090159 A1\* 4/2011 Kurashima ............. G06F 3/044
                                                    345/173
2012/0282449 A1   11/2012 Gross
2015/0329755 A1   11/2015 Hakoshima et al.

FOREIGN PATENT DOCUMENTS

| CN | 103974919 A | 8/2014 |
|----|-------------|--------|
| JP | 2002-326841 | 11/2002 |
| JP | 2011-510904 | 4/2011 |
| JP | 2014-55981 | 3/2014 |
| JP | 2014-124913 | 7/2014 |
| WO | WO 2012/151459 A1 | 11/2012 |
| WO | WO 2012/160894 A1 | 11/2012 |
| WO | WO 2013/089178 A1 | 6/2013 |

OTHER PUBLICATIONS

Written Opinion dated Jan. 26, 2016 in PCT/JP2015/082371, filed on Nov. 18, 2015.

\* cited by examiner of the resin substrate, the thickness may be 3 mm or less, and, for example, within a range of 0.2-2.0 mm. The thickness of the resin substrate is preferably within a range of 0.3-1.5 mm.

TRANSPARENT PLATE, TOUCH PAD, AND TOUCH PANEL

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/082371 filed on Nov. 18, 2015 and designating the U.S., which claims priority of Japanese Patent Applications No. 2014-236007 filed on Nov. 20, 2014 and No. 2015-140171 filed on Jul. 14, 2015. The entire contents of the foregoing applications are incorporated herein by reference.

BACKGROUND OF THE INVENTION

1. Field of the Invention

The present invention relates to a transparent plate, a touch pad, and a touch panel.

2. Description of the Related Art

Transparent plates designed for touch pads or touch panels, in which various function layers are formed on transparent substrates, have been developed (See, for example, WO 2012/160894). According to WO 2012/160894, as a function layer, a hard coat layer is formed with a cured material of a polymerizable composition including fine particles with average grain diameter of 1-100 μm. According to the configuration, a product with a high degree of hardness and free from a sticking effect with a user's finger can be obtained.

According to WO 2012/160894, there has been a problem of high haze values due to fine particles with average grain diameters of 1-100 μm included in function layers.

One of exemplary purposes of aspects of the present invention is to provide a transparent plate by which a tactile sensation different from the related art can be obtained while the haze value remains low.

SUMMARY OF THE INVENTION

It is a general object of at least one embodiment of the present invention to provide a transparent plate, a touch pad, and a touch panel that substantially obviate one or more problems caused by the limitations and disadvantages of the related art.

In order to solve the above-described problem, according to an aspect of the preferred embodiment, a transparent plate including a transparent substrate and an antifouling layer, a surface of the transparent substrate including a fine projecting and recessed structure with a surface roughness Ra of 2.0-100 nm, the antifouling layer including fluorine, and at least a part of the antifouling layer being formed on a position of the fine projecting and recessed structure, a haze value of the transparent plate at the position of the fine projecting and recessed structure being 2% or less, and a value of X defined by $$X = (S_1 - S_2)/(S_1 - S_2)$$

being 0.5 or more, where $S_1$ is an F-Kα line strength of the transparent plate at the position of the fine projecting and recessed structure, measured by a flourescent X-ray measurement device from an antifouling layer side, $S_2$ is an F-Kα line strength of a reference glass plate that does not include fluorine substantially, measured by the fluorescent X-ray measurement device, and $S_3$ is an F-Kα line strength of a reference aluminosilicate glass plate that includes fluorine of 2 wt %, measured by the fluorescent X-ray measurement device, is provided.

According to the embodiment of the present invention, a transparent plate by which a tactile sensation different from the related art can be obtained while the haze value remains low.

BRIEF DESCRIPTION OF THE DRAWINGS

Other objects end further features of embodiments will become apparent from the following detailed description when read in conjunction with the accompanying drawings, in which.

DESCRIPTION OF THE PREFERRED EMBODIMENTS

Figure 1:
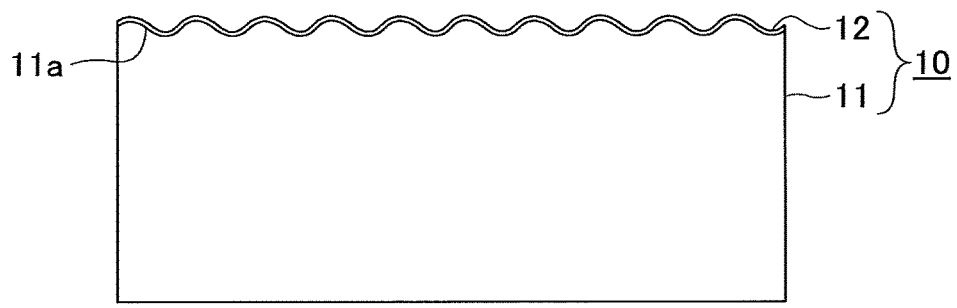
FIG. 1 is a diagram depicting an example of a transparent plate according to an embodiment.

In the following, with reference to the accompanying drawings, and exemplary embodiment of the present invention will be described. In each of the drawings, for a same or a corresponding member, the same or a corresponding reference numeral is assigned and an explanation will be omitted accordingly. In the specification, a symbol "-" representing a numerical range indicates that the range includes numerical values before and after "-".

FIG. 1 is a diagram depicting a transparent plate according to the embodiment of the present invention. The transparent plate 10 includes a glass substrate 11 as a transparent substrate, and an antifouling layer 12. In addition, a resin substrate may be used instead of the glass substrate 11.

A thickness of the glass substrate 11 is preferably 3 mm or less and, for example, may also fall within a range of 0.2-2.0 mm. The thickness of the glass substrate 11 more preferably falls within a range of 0.3-1.5 mm. When the thickness of the glass substrate 11 is 3 mm or more, the weight increases and reduction in weight becomes difficult to achieve, and a raw material cost increases.

A Martens hardness of the glass substrate 11 may be, for example, 2000 N/mm² or more but less thank 4500 N/mm², and is more preferably, 2000 N/mm² or more but 4000 N/mm² or less. When the Martens hardness is 2000 N/mm² or more, the glass substrate 11 has good durability. Moreover, when the Martens hardness is less than 4500 N/mm², processing such as cutting can be performed. In the case where the Martens hardness is 4000 N/mm² or less, an appropriate feeling of deflection can be obtained when touching the glass substrate 11 with a finger. The Martens hardness is further preferably 2000-3500 N/mm². The Martens hardness is an index of indicating a softness of a surface of a cover glass, and can be measured using a method compliant with ISO 14577.

The glass substrate 11 preferably has a high transmittance in a wavelength region of 400-700 nm, for example, a transmittance of 80% or more. Moreover, the glass substrate 11 preferably has a sufficient insulation property and a high chemical and physical durability.

The glass substrate 11 is shaped by the float process, the fusion process or the like. The glass substrate 11 is formed with a soda-lime silicate glass, an alumino-silicate glass, an alkali-free glass, or the like. The glass substrate 11 may be a chemically strengthened glass that is subjected to a chemically strengthening process, or may be a non-strengthened glass. In the case of the chemically strengthened glass, the glass substrate 11 includes an alkali metal.

The glass substrate 11 includes, in terms of mol %, $SiO_2$ of 61%-77%, $Al_2O_3$ of 1%-18%, $Na_2O$ of 8%-18%, $K_2O$ of 0%-6%, MgO of 0%-15%, $B_2O_3$ of 0%-8%, CaO of 0%-9%, SrO of 0%-1%, BaO of 0%-1%, and $ZrO_2$ of 0%-4%.

$SiO_2$ is a component that configures a framework of a glass, and is indispensable. In the case where $SiO_2$ is less than 61 mol %, when a glass surface is damaged, a crack will readily occur, a weather resistance is reduced, a specific weight increases, a liquid phase temperature rises and the glass becomes unstable, or the like. Therefore, $SiO_2$ is preferably 63 mol % or more. In the case where $SiO_2$ is greater that 77 mol %, the temperature T2, at which the viscosity becomes $10^2$ dPa·s, or the temperature T4, at which the viscosity becomes $10^4$ dPa·s rises; thus, melting or shaping of the glass becomes difficult. Furthermore, the weather resistance is reduced. Therefore, $SiO_2$ is preferably 70 mol % or less.

$Al_2O_3$ is a component that enhances an ion exchange performance and the weather resistance, and is indispensable. When $Al_2O_3$ is less than 1 mol %, a desired surface compression stress or a compression stress layer thickness is difficult to be obtained by ion exchange. Moreover, the weather resistance is reduced. According to the above-described reasons, $Al_2O_3$ is preferably 5 mol % or more. When $Al_2O_3$ is greater than 18 mol %, the temperatures T2 or T4 rises and thus melting or shaping of the glass becomes difficult, or the liquid phase temperature rises, and thereby devitrification readily occurs.

$Na_2O$ is a component that reduces variation in the surface compression stress upon ion exchange, forms the surface compression stress layer by the ion exchange, or enhances a melting performance of the glass, and is indispensable. When $Na_2O$ is less than 8 mol %, the desired surface compression stress layer becomes difficult to form by the ion exchange, or T2 or T4 rises, and melting or shaping of the glass becomes difficult. Therefore, $Na_2O$ is preferably 10 mol % or more. When $Na_2O$ is greater than 18 mol %, the weather resistance is reduced or a crack readily occurs from an indentation.

$K_2O$ is not indispensable, but is a component that increases an ion exchange rate. The glass can include up to 6 mol % of $K_2O$. When $K_2O$ is greater than 6 mol %, the variation in the surface compression stress upon ion exchange is great, a crack readily occurs from an indentation, or the weather resistance is reduced.

MgO is a component that enhances the melting performance, and may be included in the glass. When MgO is greater than 15 mol %, the variation in the surface compression stress upon ion exchange is great, the liquid phase temperature rises and thereby devitrification readily occurs, or the ion exchange rate decreases. Therefore, MgO is preferably 12 mol % or less.

$B_2O_3$ is preferably 8 mol % or less in order to enhance the melting performance. When $B_2O_3$ is greater than 8 mol %, a homogeneous glass is difficult to be obtained, and shaping of the glass is difficult to be obtained, and shaping of the glass may become difficult.

CaO may be included in the glass up to 9 mol % in order to enhance the melting performance at high temperature, or in order to make devitrification difficult to occur. However, the variation in the surface compression stress upon ion exchange may become great, or the ion exchange rate or resistance against generation of crack may be reduced.

BaO of 1 mol % or less may be included in the glass in order to enhance the melting performance at high temperature, or in order to make devitrification difficult to occur. However, the variation in the surface compression stress upon ion exchange may become great, or the ion exchange rate or the resistance against generation of crack may be reduced.

ZrO2 is not an indispensable component, but may be included in the glass up to 4 mol %, in order to increase the surface compression stress, enhance the weather resistance, or the like. When ZrO2 is greater than 4 mol %, the variation in the surface compression stress upon ion exchange becomes great, or the resistance against generation of crack is reduced.

The antifouling layer 12 is to prevent a fouling such as a fingerprint or an oil spot from adhering, or facilitate removing such a fouling. The antifouling layer 12 has at least one of a function of preventing a fingerprint from adhering and a function of facilitating removing the fingerprint. The antifouling layer 12 is formed of, for example, an aggregate of resin strands that extend vertically obliquely from a surface of the glass substrate 11.

The antifouling layer 12 is formed of a resin including fluorine. A material used for the antifouling layer 12 includes, for example, a resin expressed by the following formula (A), a resin expressed by the following formula (B) or the like.

[Chemical 1]

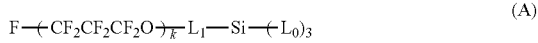

(A)

In the chemical formula (A), $L_1$ is a bonding structure including an ether bonding, an amide bonding or the like, formed from C, H, O, N, F or the like. A subscript k is a repeat count, and is a natural number of 1 or more but 1000 or less. Moreover, $L_0$ is a hydrolysable group that can be exchanged with a terminal OH group of a glass.

$L_0$ is preferably a halogen other than fluorine or an alkoxy group (—OR). In the embodiment, R is a straight chain hydrocarbon or a branched chain hydrocarbon including 1 to 6 carbon atoms. For example, R includes a hydrocarbon, such as —$CH_3$, —$C_2H_5$, or —$CH(CH_3)_2$. The halogen is preferably chlorine. The alkoxy silane is preferably trimethoxy silane or $Si(OMe)_3$.

[Chemical 2]

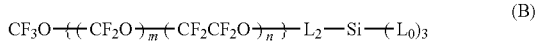
(B)

In the chemical formula (B), $L_2$ is a bonding structure including an ether bonding, an amide bonding or the like, formed from C, H, O, N, F or the like. Subscripts m and n are repeat counts, and are natural numbers of 1 or more but 1000 or less, respectively. Moreover, $L_0$ is a hydrolysable group that is the same as in the chemical formula (A).

For a material of the antifouling layer, S600 (product name, manufactured by Asahi Glass Co., Ltd.), S550 (product name, manufactured by Asahi Glass Co., Ltd.), KY-178 (product name, manufactured by Shin-Etsu Chemical Co., Ltd.), KY-185 (product name, manufactured by Shin-Etsu Chemical Co., Ltd.), X-71-186 (product name, manufactured by Shin-Etsu Chemical Co., Ltd.), X-71-190 (product name, manufactured by Shin-Etsu Chemical Co., Ltd.), OPTOOL (trademark registered) DSX (product name, manufactured by Daikin Industries Ltd.), or OPTOOL (trademark registered) AES (product name, manufactured by Daikin Industries Ltd.) or the like is preferably used.

It should be noted that when an amount of film deposition for the antifouling layer 12 exceeds a threshold value according to a surface roughness of a film deposition site, an aggregate of an amount depending on the excess amount is formed. Therefore, the above-described film deposition amount has an upper limit, and the amount of film deposition is set so as not to generate the aggregate. When an aggregate is formed, a haze value (degree of dispersion, opacity) of the transparent plate 10 increases, and a commercial value is significantly reduced when the transparent plate 10 is incorporated into a touch panel. Because a tactile sensation depends on the amount of film deposition, when the film deposition is restricted, the tactile sensation that can be set is also restricted within a predetermined range.

The glass substrate 11 has a fine projecting and recessed structure 11a with a surface roughness Ra of 0.3-300 nm on a surface of the glass substrate. The surface roughness Ra is an arithmetic mean roughness described in Japanese Industrial Standard (JIS B 0601). When the surface roughness Ra is 0.3 nm or more, a surface area of the glass substrate 11 is great, and a probability that the material or the antifouling film 12 reacts with the surface of the glass substrate 11 increases, thus it becomes possible to prevent the material of the antifouling layer 12 from aggregating, and the haze value arising from the aggregation can be prevented from increasing. Then, it becomes possible to increase the amount of film deposition of the antifouling layer 12, and a different tactile sensation from the related art can be obtained when touching by finger. Furthermore, becomes a greater amount of the material of the antifouling layer 12 is bonded to the glass substrate, compared with the case of forming an antifouling layer on a glass substrate that does not have the fine projecting and recessed structure 11a, the predetermined tactile sensation can be maintained for a long period of time. When the surface roughness Ra is 300 nm or less, a low haze value comparable to the case of the surface roughness Ra of 0.2 nm or less can be obtained, and a transparency can be acquired. The surface roughness Ra is preferably 0.3-200 nm, and more preferably 0.3-100 nm.

At least a part of the antifouling layer 12 is formed at a position of the fine projecting and recessed structure 11a. Therefore, the low haze value can be maintained, and the amount of film deposition of the antifouling layer 12 can be increase. As a value indicating the amount of film deposition of the antifouling layer 12, an index X expressed by the following formula (1) will be employed:

$$X=(S_1-S_2)/(S_3-S_2) \quad (1)$$

where $S_1$ is an F-Kα line strength of the transparent plate 10 at the position of the fine projecting and recessed structure 11a, measured by a fluorescent X-ray measurement device from an antifouling layer 12 side, $S_2$ is an F-Kα line strength of a reference glass plate that does not include fluorine substantially, measured by the fluorescent X-ray measurement device, and $S_3$ is an F-Kα line strength of an aluminosilicate glass plate (standard sample) that includes fluorine of 2 wt % measured by the fluorescent X-ray measurement device.

The "glass plate that does not include fluorine substantially" means a glass plate whose content of fluorine measured by the secondary ion mass spectroscopy (SIMS) is less than 100 ppm, and may be a commercially available soda-lime glass or the like, for example. When the glass substrate 11 does not include fluorine substantially, the glass substrate 11 before forming the film of the antifouling layer 12 may be measured. As illustrated in the formula (1), by subtracting S2 from S1 and S3, respectively, a zero point correction is performed for the fluorescent X-ray measurement device. The antifouling layer 12 includes fluorine atoms. By measuring the index X expressed in the above formula (1), the amount of film deposition of the antifouling layer 12 can be determined.

According to an aspect, the transparent plate 10, whose haze value at the position of the fine projecting and recessed structure 11a is 2% or less and whose index X expressed by the formula (1) is 0.5 or more, is provided. Detail will be described in the section of the practical examples. Such a transparent plate 10 has not been present conventionally. Furthermore, a tactile sensation that is different from the conventional one can be obtained. The haze value is preferably 1.5% or less. The index X is preferably 0.5-10, and more preferably 0.5-7.

According to another aspect, when the haze value of the transparent plate 10 at the position of the fine projecting and recessed structure 11a is denoted as Y (%), a transparent plate 10 that satisfies the following formulas (2) and (3):

$$Y \leq a \times X+b, \quad (2)$$

$$Y \leq 2, \quad (3)$$

a=0.67 (%), and
b=−0.33 (%).

Detail will be described in the section of the practical examples; such a transparent plate 10 has not been present conventionally, and a tactile sensation that is different from the conventional one can be obtained while maintaining the low haze value. In formula (2), values of a and b was determined, respectively, based on results of evaluation for examples 1 to 43, which will be described later. The value of the index X is preferably 0.5-10, and more preferably 0.5-7.

A thickness of the antifouling layer 12 is, for example, 1-100 nm.

The surface roughness of the antifouling layer 12 may be the same as the surface roughness of the glass substrate 11.

The transparent plate 10 may include an inorganic layer as a function layer between the glass substrate 11 and the antifouling layer 12. The inorganic layer is a multilayered film including any one layer of an oxide layer, a nitride layer, an oxygen nitride film, and a metallic film, or a selectable combination of two or more layers thereof. Furthermore, the inorganic layer is a function layer that can fulfill one or more functions of a base layer, an antireflection layer, which will be described below, a high reflection layer (also referred to as a mirror layer), a low radiation layer, and the like.

The transparent plate 10 may include a base layer between the glass substrate 11 and the antifouling layer 12. The base layer has an effect of improving adhesiveness between the glass substrate 11 and the antifouling layer 12. The base layer is formed of an inorganic layer such as silicon oxide.

Moreover, the transparent plate 10 may include an inorganic layer such as an antireflection layer between the glass substrate 11 and the antifouling layer 12. The antireflection layer may be formed by using a publicly known method, and may be a multilayered film obtained by alternately laminating lasers having refractive indices different from each other (e.g. silicon oxide and titanium oxide). The antireflection layer may be a single layered film having a refractive index of 1.6 or less. Such a single layered film includes, for example, a silica layer, a fluorine-doped silica film, a magnesium fluoride film, or the like. Moreover, the antireflection film may be formed by using the sol-gel method. The "refractive index" mentioned here means a refractive index for light haying a wavelength of 550 nm, and measured at a room temperature.

The transparent plate 10 may include both the base layer and the antireflection layer between the glass substrate 11 and the antifouling layer 12. In this case, the transparent plate 10 may include the antireflection layer, the base layer, and the antifouling layer in this order from the glass substrate 11 side.

Figure 2:
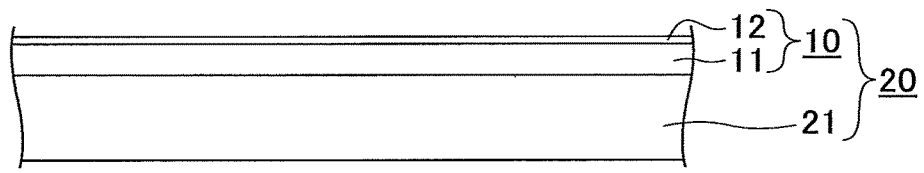
FIG. 2 is a diagram depicting an example of a touch panel including the transparent plate according to the embodiment.

FIG. 2 is a diagram depicting an example of a touch pad using the transparent plate according to embodiments of the present invention. In FIG. 2, representation of the fine projecting and recessed structure 11a, illustrated in FIG. 1, is omitted.

The touch pad 20 includes the transparent plate 10 and a position detector 21. The position detector may be a general detector that detects a touch position of a finger on the transparent plate 10, by using a change in an electrostatic capacitance, for example.

Because the touch pad 20 is provided with the transparent plate 10, it is possible to obtain a tactile sensation that is different from the conventional one and with a low haze value. The touch pad 20 is incorporated into a laptop computer or the like.

Figure 3:
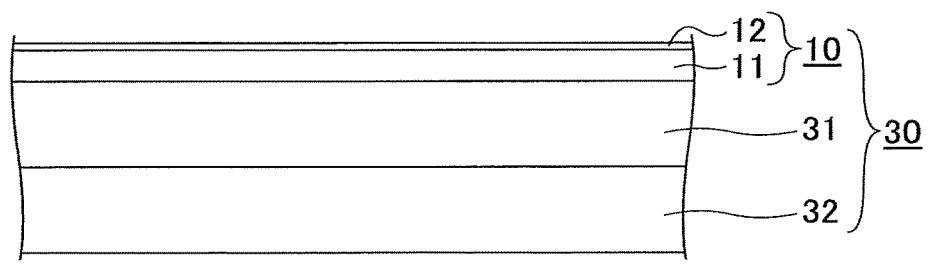
FIG. 3 is a diagram depicting another example of the touch panel including the transparent plate according to to the embodiment.

FIG. 3 is a diagram depicting an example of a touch panel using a transparent plate according to embodiments of the present invention. In FIG. 3, representation of the fine projecting and recessed structure 11a, illustrated in FIG. 1, is omitted.

The touch panel 30 includes a transparent plate 10, a position detector 31, and an image display device 32. The position detector may be a general detector that detects a touch position of a finger on the transparent plate 10, by using a change in an electrostatic capacitance, for example. The image display device 32 may be a general display device, which includes a liquid crystal display or the like, and displays an image in response to a result of detection by the position detector 31.

Because the touch panel 30 is provided with the transparent plate 10, it is possible to obtain a tactile sensation that is different from the conventional one and with, a low haze value. The touch panel 30 is, for example, incorporated into digital information equipment. The digital information equipment includes a mobile phone (including smartphone), a computer (including tablet type computer), a copy machine, a facsimile machine or the like.

The transparent plate 10 according to the embodiment in FIG. 2 is incorporated into the touch pad 20, and the transparent plate 10 according to the embodiment in FIG. 3 is incorporated into the touch panel 30. However, the transparent plate 10 may be incorporated into other products. For example, the transparent plate 10 may be used as a housing of a device, a cover of an image display device, or the like.

Moreover, the transparent plate 10 may be touched by a pen instead of a finger. It is possible to obtain a writing feeling that is different from the conventional one and with a low haze value.

Moreover, the arrangement of the position detector 31 and the image display device 32 may be reversed. The position detector 31 may be arranged on an opposite side to the transparent plate 10 with reference to the image display device 32.

Figure 4:
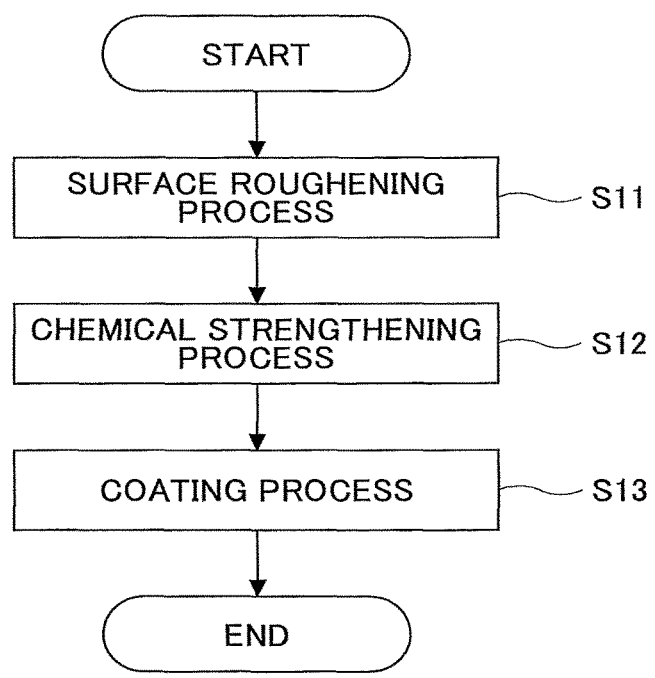
FIG. 4 is a flowchart depicting an example of a manufacturing method for the transparent plate according to the embodiment.

FIG. 4 is a flowchart depicting an example of a manufacturing method of a transparent plate according to the embodiment. As illustrated in FIG. 4, the manufacturing method of a transparent plate includes a surface roughening process S11, a chemically strengthening process S12 and a coating process S13. The chemically strengthening process S12 is an optional process, and may be performed as necessary.

In the surface roughening process S11, by roughening a surface of a glass substrate, a fine projecting and recessed structure with a surface roughness Ra of 0.3-300 nm is formed. For example, in the surface roughening process S11, an etching process is performed on the surface of the glass substrate 11. The etching process may be a chemical etching or a physical etching. In the case of the chemical etching process, any of a dry etching or a wet etching may be employed. In the dry etching, a process gas including a hydrogen fluoride (HF) gas, for example, may be used.

A temperature of the etching process is not particularly limited, but is normally within a range of 400-800° C. The temperature of the etching process is preferably within a range of 500-700° C., and more preferably within a range of 500-650° C.

The process gas may include a carrier gas and a diluent gas in addition to the hydrogen fluoride gas. The carrier gas and the diluent gas are not particularly limited, but for example nitrogen, argon and/or the like is used. Moreover, water may be added.

Concentration of the hydrogen fluoride gas in the process gas is not particularly limited, as long as the surface of the glass substrate is properly subject to the etching process. The concentration of the hydrogen fluoride gas in the process gas is, for example, within a region of 0.1-10 vol %, preferably 0.3-5 vol %, and more preferably 0.5-4 vol %. At this time, the concentration of the hydrogen fluoride gas in the process gas (vol %) is obtained by (flow rate of fluorine gas)/(flow rate of fluorine gas+flow rate of carrier gas+flow rate of diluent gas).

The etching process of the glass substrate may be performed in a reaction container. However, in the case of a glass substrate with a great size, if it is necessary, the etching process of the glass substrate may be performed in a state where the glass substrate is being conveyed. In this case, compared with the reaction in the reaction container, a quicker and more efficient process can be performed.

Next, an example of a device that can be used for the etching process will be described.

Figure 5:
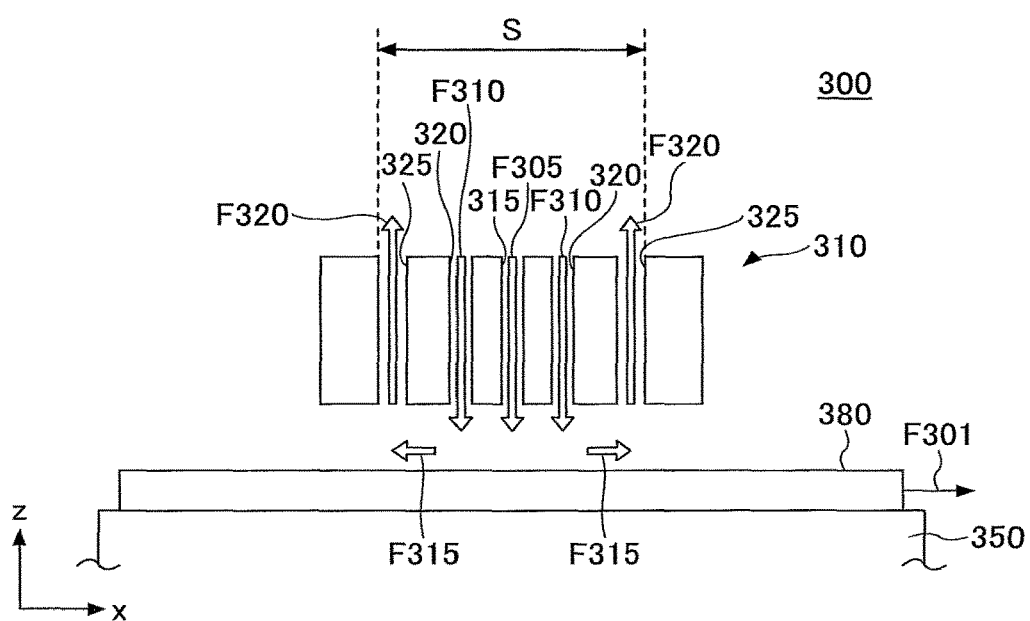
FIG. 5 is a diagram depicting an example of a processing apparatus used for etching processing for the glass substrate according to the embodiment.

FIG. 5 is a diagram depicting an example of a processing apparatus used for the etching process of the glass substrate according to the embodiment of the present invention. The processing apparatus, illustrated in FIG. 5, can perform the etching process of the glass substrate in the state where the glass substrate is being conveyed.

As illustrated in FIG. 5, the processing apparatus 300 is provided with an injector 310 and a conveyance means 350.

The conveyance means 350 can convey a glass substrate 380, which is placed on an upper portion, in the horizontal direction (x-axis direction), as indicated by an arrow F301.

The injector 310 is arranged above the conveyance means 350 and the glass substrate 380.

The injector 310 includes a plurality of silts 315, 320 and 325 that provide a flow passageway of the process gas. That is, the injector 310 is provided with the first slit 315 arranged in a central part thereof along the vertical direction (z-axis direction), the second slits 320 arranged so as to surround the first slit 315 along the vertical direction (z-axis direction), and the third slits 325 arranged so as to surround the second silts 320 along the vertical direction (z-axis direction).

One end (upper part) of the first slit 315 is connected to a hydrogen fluoride gas source (not illustrated) and a carrier gas source (not illustrated), and the other end (lower part) of the first slit 315 is oriented toward the glass substrate 380. Similarly, one end (upper part) of the second slit 320 is connected to a diluent gas source (not illustrated), and the other end (lower part) of the second slit 320 is oriented toward the glass substrate 380. One end (upper part) of the third slit 325 is connected to an exhaust system (not illustrated), and the other end (lower part) of the third slit 325 is oriented toward the glass substrate 380.

In the case where the etching process of the glass substrate 380 is performed by using the processing apparatus 300, configured as above, first, a hydrogen fluoride gas is supplied from the hydrogen fluoride gas source (not illustrated) via the first slit 315 in the direction of the arrow F305. Moreover, a diluent gas such as nitrogen is supplied from the diluent gas source (not illustrated) via the second slits 320 in the direction of the arrows F310. These gases are moved by the exhaust system, in the horizontal direction (x-axis direction) along the arrows F315, and ejected to the outside of the processing apparatus 300 via the third silts 325.

To the first slit 315, a carrier gas such as nitrogen may be supplied simultaneously with the hydrogen fluoride gas.

Next, the conveyance means 350 is operated. Then, the glass substrate 380 moves in the direction of the arrow F301.

The glass substrate 380 contacts with the process gas supplied from the first slit 315 and the second slit 320 (hydrogen fluoride gas+carrier gas+diluent gas) when passing below the injector 310. According to the above-described operation, an upper surface of the glass substrate 380 is subjected to the etching process.

The process gas supplied on the upper surface of the glass substrate 380 moves, as illustrated by the arrow F315, and is used for the etching process. Then, the process gas moves as the arrow F320, and is ejected to the outside of the processing apparatus 300 via the third slit that is connected to the exhaust system.

By using the above-described processing apparatus 300, the etching process by the process gas can be performed while conveying the glass substrate. In this case, compared with a method of performing the etching process by using a reaction container, process efficiency can be improved.

Moreover, in the case of using such a processing apparatus 300, the etching process can be performed for a glass substrate with a great size.

A rate of supplying the process gas to the glass substrate 380 is not particularly limited. The rate of supplying the process gas may be within a range of 0.1-1000 SLM (Standard Litter per Minute). Moreover, a passing time of the injector 310 of the glass substrate 380 (time required for passing a distance, S in FIG. 5) is within a range of 1-120 seconds, preferably within a range of 2-60 seconds, and more preferably within a range of 3-30 seconds. When the passing time of the injector 310 of the glass substrate 380 is set to be 320 seconds or less, a quicker etching process can be performed. In the following, the passing time of the injector 310 of the glass substrate 380 will be also referred to as an "etching process time".

In this way, by using the processing apparatus 300, the etching process can be performed for a glass substrate that is in the conveyance state.

The processing apparatus 300, illustrated in FIG. 5 is merely an example, and the etching process of the glass substrate by the process gas including the hydrogen fluoride gas may be performed using another apparatus. For example, in the processing apparatus 300 illustrated in FIG. 5, the glass substrate 380 moves relatively with respect to the injector 310 at rest. However, contrary to this, the injector may move relatively in the horizontal direction with respect to the glass substrate at rest. Alternatively, both the glass substrate and the injector may move in opposite directions to each other. Moreover, an injector may be arranged below the conveyance means 350 and the glass substrate, to perform the etching process for a lower side of the glass.

Moreover, in the processing apparatus 300, illustrated in FIG. 5, the injector 310 includes the three slits 315, 320 and 325 in total. However, the number of slits is not particularly limited. For example, the number of slits may be two. In this case, one slit may be used for supplying the process gas (mixed gas of carrier gas, the hydrogen fluoride gas, and the diluent gas), and the other slit may be used for ejecting gas. Moreover, one or more slits may be arranged between the slit 320 and the slit for ejecting gas 325, and may be caused to supply the etching gas, the carrier gas, and the diluent gas.

Furthermore, in the processing apparatus 300, illustrated in FIG. 5, the second slots 320 of the injector 310 are arranged so as to surround the first slit 315, and the third slits 325 are arranged so as to surround the first slit 315 and the second slit 320. However, instead of the above-described configuration, the first slit, the second silt and the third slit may be arranged in a line along the horizontal direction (x-axis direction). In this case, the process gas moves in one direction along the upper surface of the glass substrate, and thereafter, is ejected via the third slit.

Furthermore, a plurality of injectors 310 may be arranged along the horizontal direction (x-axis direction) on the conveyance means 350.

Furthermore, by using another apparatus or the like, a layer including silicon oxide as a main component may be laminated on the same surface as the surface that was subjected to the etching process. By laminating the layer, chemical durability of the surface that was subjected to the etching process can be enhanced.

Moreover, by masking the glass substrate in advance before performing the etching process, it is possible to perform the etching process partially for a desired region at the surface of the glass substrate, or it is possible to apply different etching conditions for different regions, respectively.

In the chemically strengthening process S12, the glass substrate is subjected to the chemically strengthening process. The "chemically strengthening process (method)" is a generic term of techniques immersing glass substrates in molten salts including alkali metals, to replace alkali metals (ions) with smaller atom diameters existing in outermost surfaces of the glass substrates by alkali metals (ions) with greater atom diameters existing in the molten salts. In the "chemically strengthening process (method)", on a surface of the processed glass substrate, alkali metals (ions) with atom diameters that are greater than the originally arranged atoms before the process are arranged. Then, a compression stress layer can be formed on the surface of the glass substrate. According to this configuration, the strength of the glass substrate is enhanced.

For example, in the case where the glass substrate includes sodium (Na), upon the chemically strengthening process, sodium is replaced in a molten salt (e.g. nitrate) by potassium (K), for example. Alternatively, for example, in the case where the glass substrate includes lithium (Li), upon the chemically strengthening process, lithium may be replaced in a molten salt (e.g. nitrate) by sodium (Na) and/or potassium (K), for example.

Conditions for the chemically strengthening process performed for a glass substrate are not particularly limited.

The molten salt includes, for example, alkali metal nitrate, alkali metal sulfate, alkali metal chloride or the like, such as sodium nitrate, potassium nitrate, sodium sulfate, potassium sulfate, sodium chloride, or potassium chloride. The above-described molten salt may be used alone, or a plurality of types of molten salts may be combined for use.

A process temperature (temperature of molten salt) varies depending on the type of the molten salt to be used. However, the process temperature may be, for example, within a range of 350-550° C.

The chemically strengthening process may also be performed, for example, by immersing a glass substrate in a molten potassium nitrate salt at 350-550° C. for about 2 minutes-20 hours. From an economical and practical point of view, it is preferably performed at 350-500° C. for 1-10 hours.

According to the above-described configurations, a glass substrate with a surface on which a compression stress layer is formed can be obtained.

As described above, the chemically strengthening process S12 is not indispensable. However, by performing the chemically strengthening process for the glass substrate, the strength of the glass substrate can be enhanced.

In the coating process S13, a material of the antifouling layer is coated on the fine projecting and recessed structure of the glass substrate. This process will be referred to as an "AFP (Anti-Finger Print) process" in the following.

The coating process may include a cleaning process, a base layer formation, an antireflection layer formation, and the like.

The material of antifouling layer used for the AFP process is a fluorinated silane coupling agent including a functional group that couples to a Si—OH group on a surface of a glass substrate or the like and fluorine. The material for the antifouling layer secures the adhesiveness with the substrate by condensing with Si—OH that exists on a surface of a glass substrate or the like.

For the material of the antifouling layer, a publicly known material can be used. For example, the above-described compound expressed by the chemical formula (A) or (B) can be used.

The above-described material may be used alone, pr a plurality of types of materials may be mixed for use. Moreover, a hydrolyzed condensate may be partially prepared by acid, alkali or the like in advance before using.

The AFP process may be performed by a dry method or by a wet method. In the dry method, by a film deposition process such as a vapor-deposition process, the material of the antifouling layer is deposited on the glass substrate. In the wet method, a solution containing the material of the antifouling layer is applied on the glass substrate, and thereafter the glass substrate is dried.

Before the AFP process, a cleaning process or a base process may be performed for the glass substrate, as necessary. Moreover, after the AFP process, in order to enhance the adhesiveness of the antifouling layer, a heating process, a humidifying process and the like may be performed.

EXAMPLES

In the following, the manufacturing method of the transparent plate and results of evaluation thereof will be described. Examples 1 to 29 are practical examples, Examples 30 to 41 are comparative examples, Example 42 is a practical example, and Example 43 is a comparative example.

(Types of Glass Substrate)

Glass substrates having thicknesses of 7 mm, shaped by the float process were prepared. Types of glass of the glass substrates include two types, i.e. glass A and glass B, as follows.

Glass A is an aluminosilicate glass (manufactured by Asahi Glass Co., Ltd., Dragontrail (trademark registered)). Glass B is a soda-lime glass (manufactured by Asahi Glass Co., Ltd., AS).

(Surface Roughening Process)

In Examples 1 to 29 and Example 42, the surface roughening process S11, illustrated in FIG. 4, was performed. In Examples 30 to 41 and Example 43, the surface roughening process S11 was not performed.

In the surface roughening process S11, the etching process by the HF gas was performed for the prepared glass substrates. For the etching process, the above-described processing apparatus 300, as illustrated in FIG. 5, gas used.

In the processing apparatus 300, a hydrogen, fluoride gas and a nitrogen gas were supplied to the first slit 315, and a nitrogen gas was supplied to the first slit 320, so that the concentration of the hydrogen fluoride gas was 0.35 vol % for Examples 1-6; 0.48 vol % for Examples 7-13 and 42; 0.60 vol % for Examples 14-21; 0.71 vol % for Examples 22-24; 0.60 vol % for Examples 25 and 26; 0.90 vol % for Examples 27 and 28; and 1.2 vol % for Example 29.

An amount of ejection gas from the third slit 325 was set to be twice the entire amount of supplied gases.

The glass substrate was convoyed in a state of being heated at 580° C. for Examples 1-24 and 42. For Examples 25-29, the glass substrate was conveyed in a state of being heated at 700° C. The temperature of the glass substrate was a value obtained by measuring for a glass substrate of the same type, at which a thermocouple was arranged, while conveying under the same conditions of heat processing.

However, surface temperature of the glass substrate may be measured directly by using a radiation thermometer.

The etching process time was set to 10 seconds.

(Surface Roughness)

The surface roughness Ra after the etching process was measured by using a scanning probe microscope (SPI3800N: manufactured by SII NanoTechnology Inc.). The measurement was performed with respect to a region of 2 μm squared of the glass substrate with a number of acquired data of 1024×1024.

Figure 6:
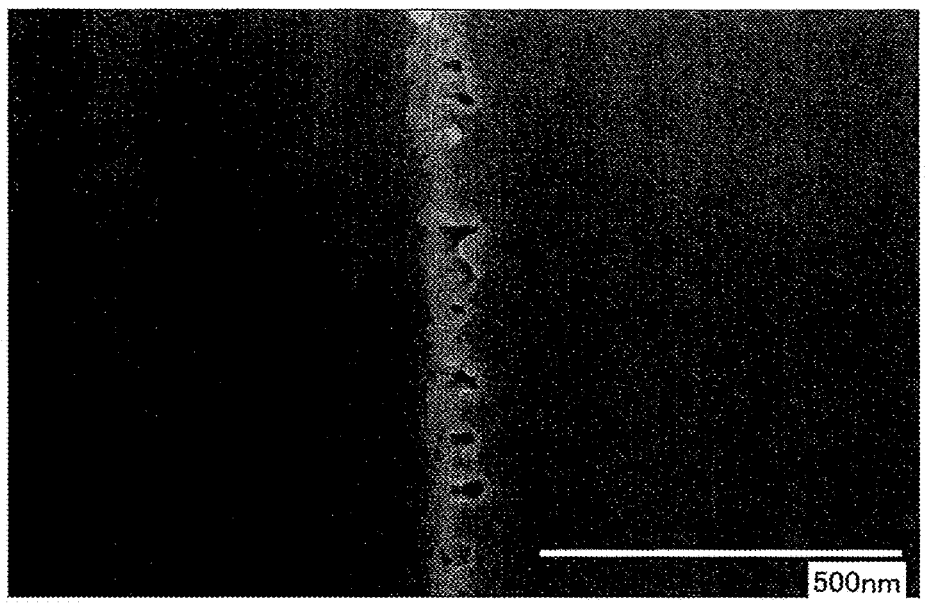
FIG. 6 is a picture of a cross-section of the glass substrate after the etching processing according to Example 14.
Figure 7:
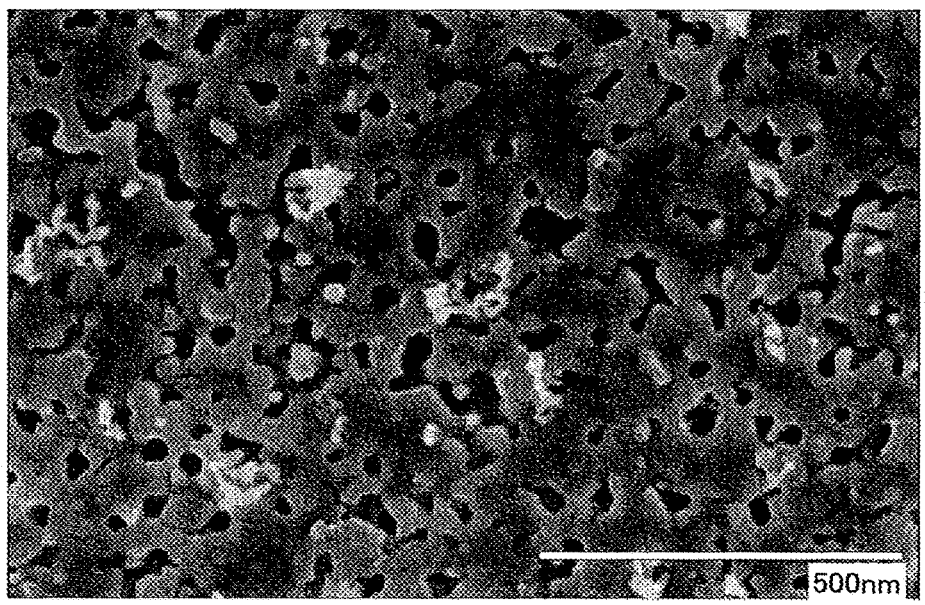
FIG. 7 is a picture of a surface of the glass substrate after the etching processing according to Example 14.

FIGS. 6 and 7 depict an example of photographs of a cross-section and a surface of the glass substrate after the etching process for Example 14. From the photographs, it is found that a fine projecting and recessed structure was formed on the surface of the glass substrate according to the etching process.

(Chemically Strengthening Process)

The chemically strengthening process S12, illustrated in FIG. 4, was performed in Examples 7-10, 17, 18, 22-24, 30-34 and 42-43. In the chemically strengthening process, the glass substrate after the etching process was immersed in a 100% potassium nitride molten salt at 450° C. for one hour. According to the chemically strengthening process, a compression stress layer was formed on the surface of the glass substrate.

The chemically strengthening process S12, illustrated in FIG. 4, was not performed in Examples 1-6, 11-16, 19-21, 25-29 and 35-41.

(Coating Process)

In Examples 1-43, the coating process S13, illustrated in FIG. 4, was performed.

In Examples 1-29, for the fine projecting and recessed structure according to the etching process on the surface of the glass substrate, the following processes were performed. In Examples 4 and 6, an AFP agent (manufactured by Asahi Glass Co., Ltd., A fluid S550 or S600) was directly deposited for the fine projecting and recessed structure according to the etching process on the surface of the glass substrate by the vapor-deposition process. In Examples 1-3, 5 and 7-29, for the fine projecting and recessed structure according to the etching process on the surface of the glass substrate, a sputter deposition was performed for an undercoat of silicone oxide, and thereafter the AFP agent was deposited by the vapor-deposition process. An amount of deposition of the AFP agent was changed for each Example. In Examples 2 and 20, after the AFP process, a heating process for heating the glass substrate at 100° C. for 60 minutes was performed (in the following, referred to as a "post heating"). The post heating was not performed in Examples 1, 3-19 and 21-29.

In Examples 30-41, for the surface of the glass substrate on which the etching process was not performed, the sputter deposition was performed for an undercoat of silicone oxide, and thereafter the AFP agent was deposited by the vapor-deposition process. Moreover, in Examples 31, after the AFP process, the post heating for heating the glass substitute was performed at 100° C. for 60 minutes. The post heating was not performed in Examples 30, and 32-41.

In Example 42, for the fine projecting and recessed structure according to the etching process on the surface of the glass substrate, the following antireflection layer was formed, and thereafter the AFP agent was deposited by the vapor-deposition process. In Example 42, after the AFP process, the post heating was not performed.

The antireflection layer was formed by laminating alternately a high refractive index layer and a low refractive index layer. For the high refractive index layer, a niobium oxide layer was used, and for the low refractive index layer, a silicon oxide layer was used.

Specifically, first, in a vacuum chamber, while introducing a mixed gas, in which an argon gas and an oxygen gas were mixed in a sccm (standard cc/min) flow ratio of 1 to 3, under a condition of a pressure of 0.3 Pa and a power density of 3.8 W/cm$^2$, magnetron sputtering was performed, and thereby a high refractive index layer including niobium oxide (niobia) with a thickness of 13 nm was forced on a surface of the glass substrate on which the etching process had been performed.

Next, while introducing a mixed gas in which an argon gas and an oxygen gas were mixed in a ratio of 1 to 3, using a silicon target, under the condition of the pressure of 0.3 Pa and the power density of 3.8 W/cm$^2$, magnetron sputtering was performed, and thereby a low refractive index layer including silicon oxide (silica) with a thickness of 35 nm was formed on the high refractive index layer.

Next, while introducing the mixed gas in which an argon gas and an oxygen gas were mixed in a ratio of 1 to 3, using a niobium target, under the condition of the pressure of 0.3 Pa and the power density of 3.8 W/cm$^2$, magnetron sputtering was performed, and thereby a high refractive index layer including niobium oxide (niobia) with a thickness of 115 nm was formed on the low refractive index layer.

Next, while introducing the mixed gas in which an argon gas and an oxygen gas were mixed in a ratio of 1 to 3, using a silicon target, under a condition of a pressure of 0.3 Pa and a power density of 3.8 W/cm$^2$, magnetron sputtering was performed, and thereby a low refractive index layer including silicon oxide (silica) with a thickness of 80 nm was formed.

In this way, the antireflection layer in which four layers of niobium oxide (niobia) and silicon oxide (silica) in total were laminated was formed. Even when the number of layers configuring the antireflection layer is other than four, a result of the same tendency can be obtained.

In Example 43, on the surface of the glass substrate on which the etching process was not performed, an antireflection layer was formed in the same way as Example 42, and thereafter, the AFP agent was deposited by the vapor-deposition process. In Example 43, after the AFP process, the post heating was not performed.

After the AFP process, using an X-ray fluorescence spectrometer (manufactured by Rigaku Corporation, ZSX Primus II), the index X expressed by the formula (1) was measured. The index X is a value indicating the amount of deposition of the ADP agent, as described above.

For the fluorescent X-ray measurement device, ZSX Primus II (manufactured by Rigaku Corporation, output power; Rh 50 kV-72 mA) was used.

Moreover, after the AFT process, the haze value of the transparent plate was measured. For the measurement of the Haze value, a Haze meter (HZ-2, manufactured by Suga Test Instruments Co., Ltd.) was used, and performed based on JIS K7361-1. For the light source, a C light source was used.

Furthermore, after the AFP process, a touch feeling upon touching the antifouling layer by a finger, i.e. the tactile sensation was evaluated by a sensory test. "Clammy" is a tactile sensation giving an impression that although a finger slides well, the surface is sticky. "Slippery" is a tactile sensation giving an impression that a finger slides well and that the surface is flat and hard. "Smooth" is a tactile sensation that a finger slides well, that a feeling of resistance is further reduced compared with "slippery", and that is free from a feeling of stress. "Moist" is a tactile sensation that a finger slide easily, and softness or gentleness can be felt.

"Silky" is a tactile sensation giving an impression that motion of a finger feels light, and that the surface is fine in texture. "Powdery" is a tactile sensation giving an impression that motion of a finger feels light, and that the surface is projecting and recessed. "Dry" is a tactile sensation that a moderate feeling of resistance is present and that the surface is dry. The above-described tactile sensations are determined by the surface roughness of the glass substrate, the amount of deposition of the material for the antifouling layer, and the like.

Figure 8:
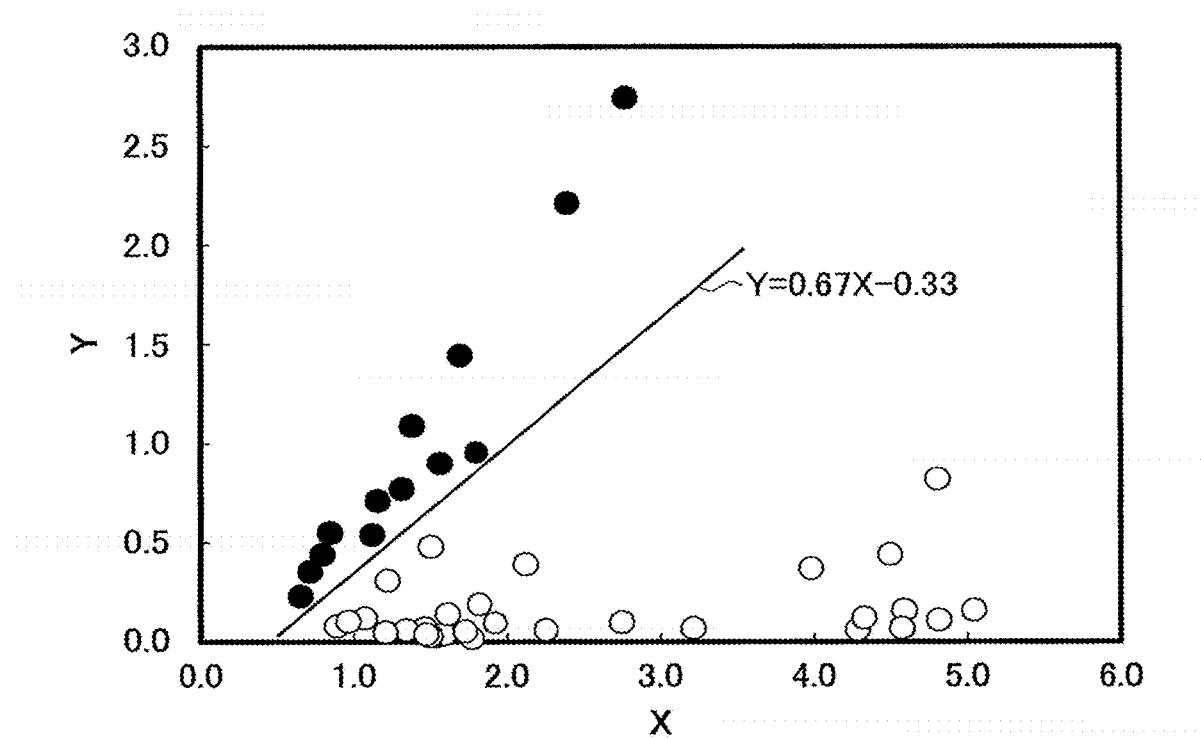
FIG. 8 is a diagram depicting a relation between "X" and "Y" of the transparent plate according Examples 1 to 43.

The results of evaluation are listed in TABLE 1, and illustrated in FIG. 8. FIG. 8 is a diagram depicting a relation between "X" and "Y" of the transparent plate in Examples 1-43. In FIG. 8, white circles indicate the results of Examples 1-29, and 42 (examples of the surface roughness Ra of 0.3 or more), and black circles indicate the results of Examples 30-41, and 43 (examples of the surface roughness Ra of less than 0.3).

tactile sensations obtained in Examples 30-41 and Example 43. Moreover, it has been proved that presence or absence of the base process or the antireflection layer or presence or absence of the post heating process in the coating process does not affect the haze value or the tactile sensation.

As described above, the preferred embodiments of the transparent plate, the touchpad, and the touch panel have been described. However, the present invention is not limited to the above-described specific embodiments, but various variations and modifications may be made without deviating from the scope of the present invention.

For example, the surface of the transparent plate may be divided into a plurality of regions, and at least one of the surface roughness Ra of the glass substrate 11 and the amount of deposition X of the antifouling layer 12 may be different for each region. Because the tactile sensation is different for each region, position recognition becomes possible.

TABLE 1

|  | glass | Ra [nm] | chemically strengthening | AFP agent | post heating | X | Y [%] | tactile/sensation |
|---|---|---|---|---|---|---|---|---|
| Ex. 1 | glass A | 0.3 | NO | S550 | NO | 1.46 | 0.07 | smooth |
| Ex. 2 | glass A | 0.3 | NO | S550 | YES | 1.34 | 0.06 | smooth |
| Ex. 3 | glass A | 0.3 | NO | S550 | NO | 1.54 | 0.03 | smooth |
| Ex. 4 | glass A | 0.3 | NO | S550 | NO | 1.58 | 0.04 | smooth |
| Ex. 5 | glass A | 0.3 | NO | S600 | NO | 1.22 | 0.31 | smooth |
| Ex. 6 | glass A | 0.3 | NO | S600 | NO | 1.50 | 0.48 | smooth |
| Ex. 7 | glass A | 2.0 | YES | S550 | NO | 2.75 | 0.10 | moist |
| Ex. 8 | glass B | 2.0 | YES | S550 | NO | 1.21 | 0.05 | moist |
| Ex. 9 | glass B | 2.0 | YES | S550 | NO | 0.89 | 0.08 | moist |
| Ex. 10 | glass B | 2.0 | YES | S550 | NO | 1.61 | 0.14 | moist |
| Ex. 11 | glass A | 2.0 | NO | S600 | NO | 4.29 | 0.06 | silky |
| Ex. 12 | glass A | 2.0 | NO | S600 | NO | 4.33 | 0.12 | silky |
| Ex. 13 | glass A | 2.0 | NO | S600 | NO | 4.59 | 0.16 | silky |
| Ex. 14 | glass A | 5.0 | NO | S600 | NO | 4.58 | 0.07 | silky |
| Ex. 15 | glass A | 5.0 | NO | S600 | NO | 5.04 | 0.16 | silky |
| Ex. 16 | glass A | 5.0 | NO | S600 | NO | 4.81 | 0.11 | silky |
| Ex. 17 | glass B | 5.0 | YES | S550 | NO | 1.07 | 0.12 | dry |
| Ex. 18 | glass B | 5.0 | YES | S550 | NO | 0.97 | 0.10 | dry |
| Ex. 19 | glass A | 5.0 | NO | S550 | NO | 1.50 | 0.03 | moist |
| Ex. 20 | glass A | 5.0 | NO | S550 | YES | 1.47 | 0.04 | moist |
| Ex. 21 | glass A | 5.0 | NO | S550 | NO | 1.77 | 0.02 | moist |
| Ex. 22 | glass B | 20 | YES | S550 | NO | 2.26 | 0.06 | powdery |
| Ex. 23 | glass B | 20 | YES | S550 | NO | 1.73 | 0.06 | powdery |
| Ex. 24 | glass B | 20 | YES | S550 | NO | 3.21 | 0.07 | powdery |
| Ex. 25 | glass A | 0.5 | NO | S600 | NO | 1.82 | 0.19 | silky |
| Ex. 26 | glass A | 5.0 | NO | S600 | NO | 3.98 | 0.37 | silky |
| Ex. 27 | glass A | 10 | NO | S600 | NO | 2.12 | 0.39 | dry |
| Ex. 28 | glass A | 10 | NO | S600 | NO | 4.50 | 0.44 | powdery |
| Ex. 29 | glass A | 30 | NO | S600 | NO | 4.81 | 0.82 | dry |
| Ex. 30 | glass A | 0.1 | YES | S550 | YES | 0.85 | 0.55 | slippery |
| Ex. 31 | glass A | 0.1 | YES | S550 | YES | 0.80 | 0.44 | slippery |
| Ex. 32 | glass A | 0.1 | YES | S550 | YES | 1.16 | 0.71 | slippery |
| Ex. 33 | glass A | 0.1 | YES | S550 | YES | 1.69 | 1.45 | clammy |
| Ex. 34 | glass A | 0.1 | YES | S550 | NO | 2.78 | 2.75 | clammy |
| Ex. 35 | glass A | 0.1 | NO | S550 | NO | 0.66 | 0.23 | slippery |
| Ex. 36 | glass A | 0.1 | NO | S550 | NO | 1.31 | 0.77 | slippery |
| Ex. 37 | glass A | 0.1 | NO | S550 | NO | 0.72 | 0.36 | slippery |
| Ex. 38 | glass A | 0.1 | NO | S550 | NO | 2.40 | 2.21 | clammy |
| Ex. 39 | glass A | 0.1 | NO | S550 | NO | 1.38 | 1.09 | slippery |
| Ex. 40 | glass A | 0.1 | NO | S550 | NO | 1.56 | 0.9 | slippery |
| Ex. 41 | glass A | 0.2 | NO | S550 | NO | 1.12 | 0.54 | slippery |
| Ex. 42 | glass A | 2.0 | YES | S550 | NO | 1.92 | 0.10 | moist |
| Ex. 43 | glass A | 0.2 | YES | S550 | NO | 1.79 | 0.96 | clammy |

As is clear from TABLE 1 and FIG. 8, in Examples 1-29, and Example 42, because the fine projecting and recessed structure with the surface roughness Ra of 0.3 or more is formed on the surface of the glass substrate, the amount of deposition of the material for the antifouling layer can be increased while maintaining a low haze value, and thereby it is possible to obtain tactile sensations different from the

What is claimed is:

1. A transparent plate comprising a transparent substrate and an antifouling layer,
wherein a surface of the transparent substrate includes a fine projecting and recessed structure with a surface roughness Ra of 2.0-100 nm, wherein the antifouling layer includes fluorine, and at least a part of the antifouling layer is formed on a position of the fine projecting and recessed structure, wherein a haze value of the transparent plate at the position of the fine projecting and recessed structure is 2% or less, and wherein the amount of film deposition for the antifouling layer is represented by a value X wherein $$X=(S_1-S_2)/(S_3-S_2)$$

is 0.5 or more, where $S_1$ is an F-Kα line strength of the transparent plate at the position of the fine projecting and recessed structure, measured by a fluorescent X-ray measurement device from an antifouling layer side, $S_2$ is an F-Kα line strength of a reference glass plate that does not include fluorine substantially, measured by the fluorescent X-ray measurement device, and $S_3$ is an F-Kα line strength of a reference aluminosilicate glass plate that includes fluorine of 2 wt %, measured by the fluorescent X-ray measurement device.

2. The transparent plate according to claim 1, further comprising:

an antireflection layer between the transparent substrate and the antifouling layer, wherein the antireflection layer is a multilayered film obtained by alternately laminating layers having refractive indices differing from each other, or a single layered film having a refractive index, for light having a wavelength of 550 nm, that is 1.6 or less.

3. The transparent plate according to claim 1, wherein the transparent substrate is a glass substrate.

4. A touch pad comprising:

the transparent plate according to claim 1; and a position detector configured to detect a touch position of a finger on the transparent plate.

5. A touch panel comprising:

the transparent plate according to claim 1;

a position detector configured to detect a touch position of a finger on the transparent plate; and an image display device configured to display an image according to a result of detection by the position detector.

6. A transparent plate comprising a transparent substrate and an antifouling layer, wherein a surface of the transparent substrate includes a fine projecting and recessed structure with a surface roughness Ra of 2.0-100 nm, wherein the antifouling layer includes fluorine, and at least a part of the antifouling layer is formed on a position of the fine projecting and recessed structure, wherein a haze value (Y (%)) of the transparent plate at the position of the fine projecting and recessed structure satisfies relations of $$Y \leq a \times X + b$$

and $$Y \leq 2,$$

where a=0.67 (%), b=−0.33 (%), $$X=(S_1-S_2)/(S_3-S_2),$$

wherein the value X represents the amount of film deposition for the antifouling layer $S_1$ is an F-Kα line strength of the transparent plate at the position of the fine projecting and recessed structure, measured by a fluorescent X-ray measurement device from an antifouling layer side, $S_2$ is an F-Kα line strength of a reference glass plate that does not include fluorine substantially, measured by the fluorescent X-ray measurement device, and $S_3$ is an F-Kα line strength of a reference aluminosilicate glass plate that includes fluorine of 2 wt %, measured by the fluorescent X-ray measurement device.

7. The transparent plate according to claim 6, further comprising:

an antireflection layer between the transparent substrate and the antifouling layer, wherein the antireflection layer is a multilayered film obtained by alternately laminating layers having refractive indices differing from each other, or a single layered film having a refractive index, for light having a wavelength of 550 nm, that is 1.6 or less.

8. The transparent plate according to claim 6, wherein the transparent substrate is a glass substrate.

9. A touch pad comprising:

the transparent plate according to claim 6; and a position detector configured to detect a touch position of a finger on the transparent plate.

10. A touch panel comprising:

the transparent plate according to claim 6;

a position detector configured to detect a touch position of a finger on the transparent plate; and an image display device configured to display an image according to a result of detection by the position detector.

* * * * *